July 5, 1960 P. J. WALSH 2,944,163
AUTOMATIC CONTROL APPARATUS
Filed March 24, 1958 2 Sheets-Sheet 1
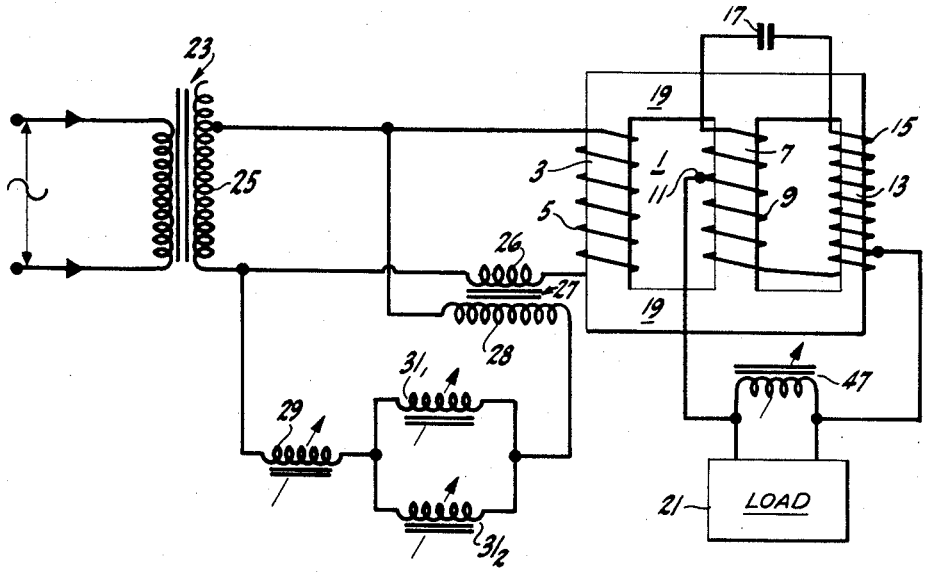
FIG-1
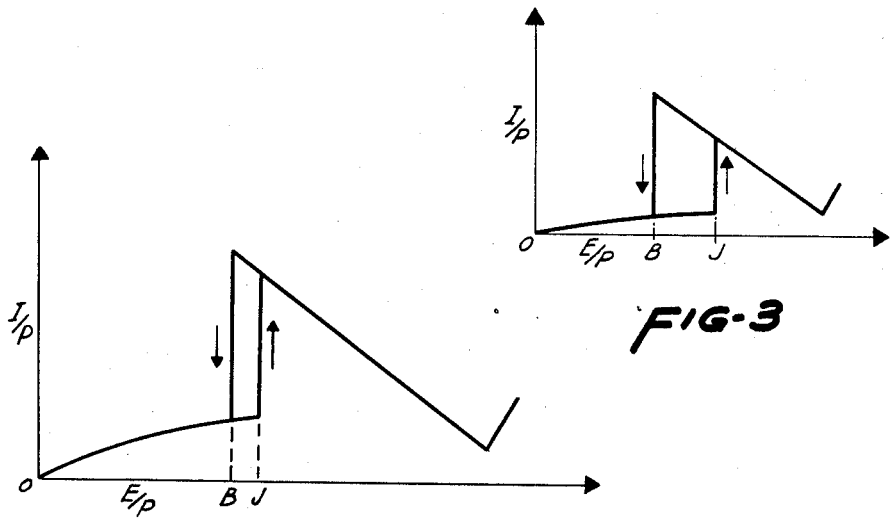
FIG-3
FIG-2
INVENTOR.
PHILIP J. WALSH
BY
Lippincott, Smith & Ralls
ATTORNEYS

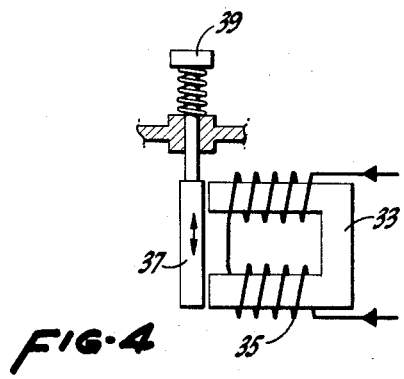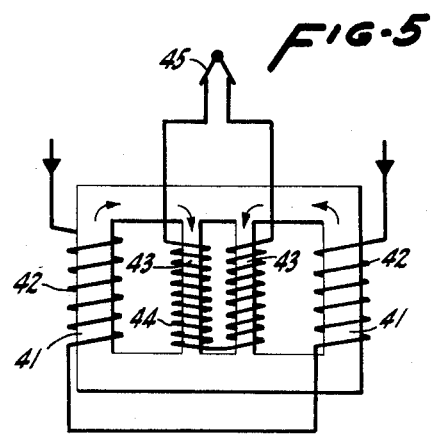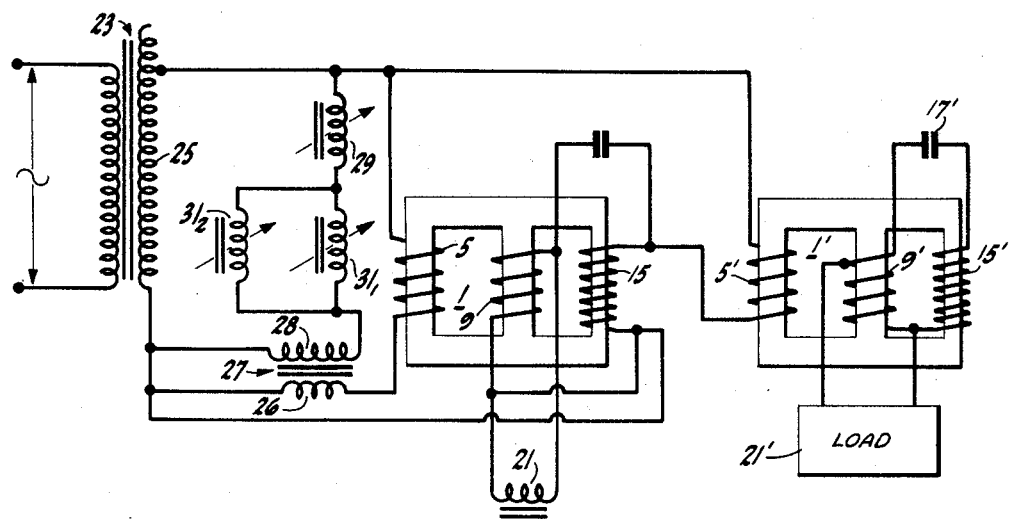
INVENTOR.
PHILIP J. WALSH
BY
Lippincott, Smith & Ralls
ATTORNEYS Patented July 5, 1960

2,944,163

AUTOMATIC CONTROL APPARATUS

Philip J. Walsh, 239 Phelan Ave., San Francisco, Calif.

Filed Mar. 24, 1958, Ser. No. 723,562

6 Claims. (Cl. 307—88)

This invention relates to apparatus for the automatic control of industrial processes, and particularly to methods of generating and employing the so-called "logic functions" that are utilized in inter-relating the necessary operations of complex aggregates of equipment.

Any system for the automatic control of electrically driven apparatus involves, basically, the switching of electrical power supplied to the various portions of the system, on or off as the case may be, upon the occurrence of certain events or combinations of events. To effectuate the control, sensing elements are employed to signal that the event has or has not occurred. Such an event may be the completion of a machining operation, the attaining of a certain temperature in a heat treating operation or any one of many other situations.

Frequently, a number of events must occur simultaneously, or a series of events be completed which do not, necessarily, occur in the same order before the further step is initiated. Sometimes, moreover, it is necessary to prevent the initiation of an operation that would normally occur because of something happening in the process that does not usually affect the event in question: a failure along the line, for example.

A control system of almost any complexity can be formed with the aid of a switching system that is responsive to a few, simple, logic functions, i.e., "AND," "OR" and "NOT."

The simplest AND circuit is a number of switches connected in series, all of which must be closed to complete a power circuit. Similarly, the simplest OR circuit is two or more switches in parallel, closure of any one of which will complete the circuit. NOT may be a separate, master switch.

It is obvious that any of these functions may be exercised by ordinary, magnetic-type relays. Relay contacts, however, are delicate; under light currents dirt may cause failure to close, while under heavy currents they may fuse, pit and stick. Vacuum tube relays have relatively short lives and for many purposes are not reliable enough to be permissible. The present trend is toward magnetic amplifiers. These, however, are expensive; they require, for their cores, alloys having special properties which may be lost if subjected to stray magnetic fields. Further, for their operation they require the use of rectifiers whose properties are sometimes uncertain.

Among the objects of the present invention are to provide automatic control apparatus that is sensitive to small control signals, but that employs no contacts, that operates directly off of ordinary commercial power supplies, and that requires, in its construction, no alloys more sensitive or unusual than ordinary silicon-steel transformer sheets. Further, it is an object to provide control apparatus that will handle directly relatively large amounts of power and that can be cascaded to handle still larger powers.

In accordance with this invention the power switching is effected by a transformer that employs the principle of "ferro-resonance"; i.e., a transformer circuit embodying an iron-core reactor whose inductance decreases with increase of input voltage, so connected in a resonant circuit that the resonance point is unstable. Such a circuit jumps suddenly, with change of applied voltage, from a below-resonance state to an above-resonance state, in either of which it is stable.

A transformer of this type is shown in my prior Patents Nos. 2,603,771 and 2,738,458, in various modifications and applications. With an applied voltage below one critical value it offers a high input impedance and delivers a relatively very low or even substantially zero voltage to its output or load circuit; when the input voltage is raised to a critical value, hereinafter termed the "jump point," its input impedance drops to a value determined by the load and its output voltage jumps to a relatively high fixed value, ten to a hundred or more times that delivered in the stable state initially described.

When the voltage supplied to the input is reduced to a second critical value, below that of the jump point, and hereinafter referred to as the "break point," the original high-input impedance, low-output-voltage state is resumed. By proper choice of circuit parameters the input voltages at which point the jump and break points occur can be accurately controlled; they may be spaced many volts apart or they can be made very nearly to coincide, spaced by only a few volts or even only a fraction of a volt.

Other characteristics of this transformer are that in passing through the jump and break points, the voltage delivered across one of the windings of the apparatus suddenly reverses in phase, and that under over-load or short-circuit conditions of the output circuit the device assumes its high input impedance state, dropping the output current to a very low value.

In accordance with the present invention a substantially constant-voltage power source is connected to the input winding of a transformer of the type mentioned, through the secondary coil of a relatively very small auxiliary transformer. The primary winding of the auxiliary transformer connects to the same source through one or more variable impedance elements connected in logic-circuit fashion, i.e., preferably in series to form an AND configuration or in parallel to form the OR configuration although, as will be shown, the duals of these arrangements can be also employed for the purpose. Depending on the magnitude, polarity, or both, of the input voltage to the auxiliary transformer the voltage applied to the primary of the ferro-resonant transformer is raised above the jump point, depressed, below the break point, or brought to an intermediate value, whereat whichever state has previously been assumed is maintained. To develop the NOT function, two arrangements are available; by means of a second, reversed primary, or other equivalent differential connection, the phase of the auxiliary transformer can be reversed or its voltage dropped to zero, or a variable impedance element may be connected across the load.

As will be shown hereinafter, various types of variable impedance elements may be used. The preferred type, however, is an iron-core reactor having a variable-reluctance magnetic circuit. Such reactors are employed as the sensing elements of the control system, the reactance being varied by alteration of an air gap, by a change in saturation of the core, or in various other fashions.

The further explanations and detailed descriptions of certain typical embodiments of the invention that follow are illustrated in the accompanying drawings wherein:

Fig. 1 is a schematic diagram of a system for controlling a load and embodying "AND," "OR" and "NOT" functions;

Figs. 2 and 3 are input voltage-current diagrams wherein the critical jump and break points are, respectively, close together and widely separated;

Fig. 4 is a semi-diagrammatic showing of a variable-reluctance reactor suitable for use as a contactless switch or as a sensing element that can be employed in the apparatus of the present invention for controlling various types of equipment;

Fig. 5 shows diagrammatically another form of variable reluctance reactor; and

Fig. 6 is a schematic diagram illustrating a circuit utilizing two ferro-resonant transformers connected in cascade.

In the diagram of Fig. 1 the transformer 1 is of the ferro-resonant type that has been described briefly above. The principles of operation, operating characteristics and design data for transformers of this type are fully set forth in my prior Patent No. 2,738,458. Briefly, this transformer comprises a three-legged, ferro-magnetic core. One of the end legs, 3, of this core, carries an input winding 5. The center leg 7 serves as the output leg in the present application of the device; it carries a winding 9, preferably wound with a greater number of turns than the winding 5; if this results in a higher voltage than is desired, for the particular control in which the device is applied, the requisite value can be taken off by a tap 11 as shown or, alternatively, a separate output winding can be provided. The other end leg, 13, is preferably of smaller cross-section than the other two legs; it also carries a winding 15. If the two coils are wound in the same direction, as will usually be the case, the two ends of the windings 7 and 15 on the same side of the core (say, the bottom) are connected together directly. The two other terminals connect together through a condenser 17 so that the windings 9 and 15 and condenser 17 form a closed loop. The three legs 3, 7 and 13 are connected by yokes 19, without air gaps.

When supplied with voltages below the jump point or if the loop just described is open-circuited, the voltages developed in the two coils of the loop oppose or buck. Coil 9 is wound to develop a higher voltage than does coil 15 and the voltage developed across the condenser 17 is the difference between that developed by the two coils. The size of the condenser is so chosen, however, that for low values of current the impedance looking into the circuit 15–17 is inductive. Moreover, for these low values of input voltage the output voltage developed across coil 9 is very low; in effect it is short-circuited by the series-resonant circuit 15–17 that it feeds.

With rising input voltage current through coil 15 increases and with increased saturation of its core its inductance drops. When its inductive reactance becomes equal to the capacitive reactance of condenser 17, i.e., as "resonance" is approached, the current through 15–17 becomes very large, further decreasing the inductive reactance of the circuit and thus making the effective impedance of the series circuit as a whole capacitive. The reactive component of current in the loop circuit therefore reverses in phase and the two coils 9 and 15 now boost with respect to the loop circuit. At the instant when this occurs, the voltage across coil 9 suddenly jumps from its previous very low value to a relatively high value—the increase in voltage can be from 10 to 20 fold. The voltage across coil 15 also jumps but not to the same extent: ordinarily only by from 20 to 50 percent. The primary effect on this latter coil is a sudden reversal of phase.

With falling voltage a reverse effect takes place. Because with falling input voltage the two coils are aiding, instead of bucking as with rising voltage, enough current flows to maintain the inductance of coil 15 below its resonant value even when the jump point is reached; the voltage must fall below this point before resonance occurs and, being unstable, it is passed through to cause the break.

Superimposed on the effects thus described are others due to loading either coil 9 or coil 15. When no load is drawn from either, the critical points are widely separated. The heavier the load the closer these points approach each other, the jump and break points both rising on the voltage scale as the load is increased. Loading coil 9 has only minor effect on the jump point but raises the break point; loading coil 15 raises both. By designing the device to supply a certain load, the separation between the points can be made anything desired.

This is illustrated in Figs. 2 and 3, which are plots of primary current in winding 5 against voltage across this winding. In Fig. 2 the transformer is so loaded as to bring the jump and break points close together, while in Fig. 3 they are widely separated and both occur at lower input voltages than under heavy load conditions. I/p is the value of the primary current through coil 5 and E/p is the value of the primary voltage across coil 5. Note that above the jump the input current desreases with increase of voltage. This is because after the jump the output voltage from either of windings 9 or 15 remains very nearly constant and therefore so too does the power supplied to a constant load connected to them. Hence, as input voltage rises the current falls, to keep their product nearly constant. It should also be noted that decreasing the capacity of condenser 17 will raise the jump point voltage and bring the jump and break points closer together for the same connected load. An inductive shunt across coil 15 has a reverse effect. By adjusting normal input voltage, output voltage (via the tap on coil 9) and the load as, for example, by a reactive or resistive shunt across it, a very high degree of flexibility can be attained with a single design of transformer 1.

When the load exceeds a certain definite maximum value the jump does not occur at all. Under these conditions the voltage across and current through the load drop substantially to zero. With less than maximum load, below the jump point, the voltages across coils 9 and 15 increase nearly linearly with increase in input voltage but not in the same ratio to their jump state output voltages. That across coil 15 will increase to, say, 60 to 75 percent of its value after the jump; that across coil 9 to from but 5 to 10 percent of its final value. Before the jump these voltages are out of phase.

It is therefore possible to take the load circuit off from across a portion of the coil 15 and a much greater portion of the coil 9, and thus secure substantially a zero voltage output for input voltages below the jump point. One transformer of the type described delivered, just below the jump point, 15 volts across coil 9 and 230 volts across this same coil immediately following the jump. Coil 15, just before the jump, delivered substantially two-thirds of the voltage delivered above the jump point. By tapping off of coil 15 at the proper point it is therefore possible to supply a bucking 15 volts before the jump, thus delivering substantially zero volts to the load; after the jump the two coils boost instead of buck, 20 volts is added to the 230 from coil 9 and the output voltage becomes 250 volts, that desired. For many purposes, however, this refinement is not required; the load 21 may be supplied from coil 9 alone. There is one important point to be noted about the arrangement where the voltages of windings 9 and 15 are balanced to zero below the jump, i.e., there is no load on the transformer before the jump occurs. The jump will therefore take place at the same value as if the load circuit were open. Above the jump point the load could be so heavy as to raise the break point above the jump point, resulting in instability. The jump point can be raised to exactly the required value, however, by connecting a relatively small load across winding 15.

The present invention utilizes the characteristics of the transformer 1, as thus set forth, to control the power supplied to the load 21 in response to control signals developed by various processes or pieces of equipment to be controlled. Power for operating the load is derived from a source of substantially constant voltage. In the present case this is symbolized by a transformer 23, energized by the usual 60-cycle, commercial power supply. In certain instances, the transformer 23 may be the usual type of commercial power transformer. Where extremely accurate or complex controls are required, particularly if the signals developed by the various sensing elements that exercise the controls are of low power, it is preferable to use a voltage-regulated supply. This can, for example, be a transformer similar to the transformer 1, wherein the load is taken from a winding corresponding to winding 15; the voltage delivered from this winding, as long as the input voltage is above the jump point, is substantially constant over a wide range of input voltages and connected load. For flexibility it is desirable that the secondary winding 25 of the power transformer be provided with a plurality of taps, to give a degree of flexibility of adjustment and permit the apparatus to meet a wide range of control situations.

The secondary winding 25 is connected to the input winding 5 of transformer 1 through the secondary coil 26 of a small auxiliary or booster transformer 27. This transformer is a low-voltage, low-power device although, being connected in series with the main power supply, its secondary winding 26 must be sufficiently heavy to carry full load current to the transformer 1.

The primary winding 28 of transformer 27 is also supplied from the source 23, being connected to that source through one or more variable impedance elements that collectively form the logic circuits that give the AND and OR functions. To attain maximum sensitivity and accuracy of control it is desirable that the jump and break points of transformer 1, when feeding its normal load, be set relatively close together. It is quite easy so to adjust the device to the load that these points are set within one or two volts of each other. Thus, taking for convenience of computation, one hundred volts as the norm, it is easy to adjust the circuit so that the jump point will occur with an input of 101 volts and the break occur at 99 volts. It is to be emphasized that these values are illustrative, not limiting, and are adopted for convenience of explanation. It will be assumed, in what follows, that the circuits of transformer 1 are so adjusted.

In the diagram of Fig. 1, variable impedance elements 29, $31_1$ and $31_2$ are so arranged that power is supplied when these elements are activated by two concurrent events: event (a) AND event (b) OR event (c). An indefinite number of AND events can be accommodated by the system or, similarly, an indefinite number of OR events.

The transformer 27 has been referred to as a "booster" transformer, implying that its voltage is added to that from the winding 25 in the arithmetical sense. As will be shown, this is not a necessary condition if other parameters of the circuit are changed slightly; the winding 26 could be connected in bucking relationship, but for the purposes of explanation the boosting relationship will be assumed. Under this condition the voltage across the coil 25 is so chosen that it is somewhat less than that required to cause the jump.

Transformer 27 is a stepdown transformer, its turns ratio being, for example, 25:1. Connected directly across the 100 volt source it would therefore boost the voltage across the coil 5 by four volts. The reactance of each of the elements 29, $31_1$ and $31_2$ may then, for example, be so chosen that at its maximum value it is equal to the input impedance of transformer 27 when its secondary is connected to the impedance of transformer 1 in its "break" condition; then, if only element 29 is effectively in circuit, the voltage from winding 25 will divide equally across reactor 29 and coil 28; coil 26 will then deliver 2 volts. Under the conditions assumed, a tap on coil 25 would be so chosen as to deliver 97 volts, which, added to the voltage from coil 26, would bring the voltage across coil 5 to 99 volts, or just below the break point of the circuit. With both elements $31_1$ and $31_2$ also in their high impedance condition the boost given by coil 26 would be still lower.

The elements 29, $31_1$ and $31_2$ are arranged to have a fairly large ratio of maximum to minimum impedance; at least 4:1 and preferably higher. Assuming the 4:1 value, when the reactance of element 29 is reduced to its minimum the voltage across coil 26 will rise slightly—about a third of a volt—above the break point, but not as far as the jump point. If either element $31_1$ or $32_2$ is changed to its minimum-reactance condition, however, the voltage delivered by coil 26 will exceed the additional 2 volts necessary to cause the jump, which will therefore occur.

Once the transformer 1 is drawing a load, the voltage of coil 26 will drop somewhat, due to the drop through the reactors. Up to full load, however, this current will not be sufficient to drop the total voltage below the break point but the additional load will be sufficient so that if either reactor 29 is restored to its maximum value or if both reactors $31_1$ and $31_2$ are at maximum, 29 remaining at minimum, the break will occur.

The reactors used may take any of a large number of forms. One of the simplest is shown schematically in Fig. 4; a horse-shoe core 33 is provided with a winding 35. It is also provided with a movable armature 37 which can be positioned so as to substantially close the magnetic circuit of the core or can be moved away so that the reactor becomes effectively an open-core device. The reluctance of the magnetic circuit resides almost entirely in the air gap and for short gaps the effective reactance is, to a first approximation, proportional to the length of the gap. It will be seen that by moving the armature in a direction shown by the arrow in any manner, as, symbolically, by depressing the push-button 39, the reactance of the device can easily be changed by much more than the postulated 4:1 ratio. The armature may be mounted, for example, on the carriage of a machine tool so that at the limit of its desired travel the armature assumes its maximum-reactance relationship to the core; so mounted the device becomes a contactless limit switch. The core may be made to rotate instead of slide between maximum and minimum reactance position, or it may be mounted as shown in the drawing to become a manually operated start or stop switch.

Fig. 5 shows a variable impedance element of quite a different type employing the variable-reluctance core principle. In this case the core has four wound legs, two end legs 41, each carrying one-half of the winding 42 whose inductance is to be varied, and two central legs 43, each carrying one-half of a winding that connects to a sensing element, in this case shown as a thermopile 45. The inductive windings 42 are so connected that considered individually their fields buck in the yokes connecting the legs, as indicated by the arrows, the magnetic circuits of the two coils each being completed through the center legs. In this condition the windings 42, jointly, offer a high reactance. The windings 44 are so connected that the voltages induced in them by the end windings also buck, so that no voltage is developed across the thermopile 45. The current from the thermopile can, however, saturate the cores 43. The fluxes from coils 42 then have no low-reluctance return path and substantially neutralize each other, dropping the impedance of the circuit through these coils to a low value.

It is not necessary that the variable impedance elements in the logic circuits be reactances. Variable resistances will serve the purpose, although not, in general, as sensitive to small voltage variations as are the reactances, since the result is an out-of-phase relationship in the voltage developed in the coil 26. It is possible, however, to use such elements as sensing devices, either directly, in place of the reactors shown at 29, 31₁–31₂, or to control the reluctance of a small auxiliary reactor. Thermistors, varistors, and the like can be used in various ways for the purpose. This specification is not primarily concerned with the type of variable impedance element employed, those cited being mentioned merely by way of illustration.

Mention has been made of the fact that the transformer secondary 26 may be so poled in relation to the principal winding 25 that it bucks instead of boosts. Under these circumstances the tap on the main supply winding is so chosen that it develops a voltage above that required to cause the jump. The operation in this case is the reverse of that which occurs when the auxiliary transformer boosts. In this case the circuit is activated when the impedance in the controlling elements is high, dropping the bucking voltage, and inactivated when the low impedance state is assumed. It is to be noted that this also reverses the "AND" and "OR" configurations; for the AND configuration the elements are in parallel, as in the case of reactors 31₁–31₂, while for the OR configuration they are in series.

It is possible, moreover, to combine the bucking and boosting configurations. The transformer 27 may be supplied with two primary windings connected in opposition and each supplied through its individual control impedance or impedances. The "impedance" in the bucking winding will, under these circumstances, normally be much the higher; frequently infinite, i.e., an open circuited switch. When the switch is closed or the impedance otherwise reduced to a low value, the bucking winding can be adjusted to override the boosting winding. So connected it becomes a very effective NOT function generator. Other types of differential connections may be employed. In general, they will result in making the boosting (or bucking) voltage zero under no load conditions, when neither positive (AND or OR) nor negative (NOT) signals are applied. In this case no allowance need be made for boost voltages through reactors in their maximum impedance state.

At times, however, it is preferable to generate the NOT function by means of a variable impedance element connected across the load. The current carried by this element in its low-impedance state is made high enough so that it overloads the device, causing it to "break" and reduce the output voltage substantially to zero. The element used can be of any of the types that have already been considered, connected across the load as shown in Fig. 1 at the reference character 47; alternatively it may be connected across coil 15.

In the apparatus as thus far described the power supplied through the control impedances and the auxiliary transformer, while small in comparison with the power it controls, will still usually be from 2 to 4 percent of the total. It should at once be apparent that this can be greatly reduced by connecting two transformers of the same type as transformer 1 in cascade. This is illustrated in Fig. 6. In this case the first transformer 1 may be a small one, developing, at full load, only a few percent of the total load to be controlled. Its control impedances, such as 29, have correspondingly small size and power consumption. The connections to transformer 1 can be any of those shown or suggested for Fig. 1. The end leg coil of the transformer 1 is connected into the circuit of the final power transformer 1' in place of the secondary 26 of the booster transformer. Arranged in this fashion the first or smaller transformer exercises an extremely powerful control, for when transformer 1 is in the "jump" state it boosts the voltage from the source while in the "break" state it actually bucks this voltage instead of merely dropping a lower value. The jump and break points of the power transformer in this case can be much more widely separated so that it is unnecessary to supply the power transformer 1' from a regulated power supply;

normal regulation is usually good enough. The load 21 on transformer 1 is in this case a dummy, preferably an inductor drawing a constant current of the proper value to bring the jump and break points to a desired value and desired separation. The load on power transformer 1' is in this case not nearly so critical.

Certain other variants of the arrangements that have been described should also be fairly obvious. It is possible, for example, so to arrange the "AND" configuration that while an ON signal to both of two impedance elements is required to turn the power on, de-energization of one of the two will reduce the input to below the jump point but not below the break point. Both must then be de-energized to cause the break.

Many variants of the circuits described should be fairly obvious. Instead of using a high ratio auxiliary transformer 27 a low ratio transformer may be used, supplied at low voltage from a tap on winding 25 or a separate winding deriving its excitation from the same ultimate source, so that its phase relationship to the winding 25 is constant. It may be an auto-transformer instead of the separate-winding type. It can even have one of the reactors incorporated in its own structure, in the form of a variable-reluctance magnetic shunt, which effectively varies the reactance in its primary circuit.

Under load, the auxiliary transformer supplies the full load current at a voltage approximately equal to the difference between the jump and break voltages. To keep the load small on the control circuit the difference voltage should be small. Where many functions must be combined however it may be advisable to separate the jump and break points more widely and to separate the logic impedances by including them in the primaries of two or more separate auxiliary transformers, the secondaries whereof are in series between the source and the primary of transformer 1.

The apparatus can be made in a wide range of sizes, depending on the duty imposed upon it. A transformer corresponding to transformer 1, having a rating of 20–25 va. weighs about 3 pounds and is capable of operating many types of solenoid valves or magnetic switches capable of handling almost any amount of power, and requires only one or two va. to operate its logic circuits. A transformer 1 to supply a load of a kilowatt or more can be controlled directly by a 10 va. auxiliary transformer or by one or two va. through a smaller transformer of similar type in cascade.

The arrangements shown and described are therefore only a few of many possible ones, illustrated because they are generally the most useful. They are not intended as limiting the scope of the invention as defined in the claims that follow.

I claim:

1. In combination with a ferro-resonant transformer the core of which has a non-rectangular hysteresis loop and having an input winding and an output winding, the voltage whereof under load jumps from low to high relative values with increase of voltage across said input winding above one critical value and breaks from said high to said low value with decrease of voltage across said input winding below a lower critical value, means for supplying and controlling a load on said transformer comprising a substantially constant-voltage alternating current source, an auxiliary transformer having a secondary winding connected in series with said input winding across said source and a primary winding, and variable impedance means connected in series with said primary winding and supplied by said source, whereby the algebraic sum of the voltage from said source and said secondary winding is above said one critical value, for one value of said variable impedance and below said lower critical value for another value of said variable impedance.

2. The combination as defined in claim 1 wherein said variable impedance means comprises a reactor having a variable-reluctance magnetic circuit.

3. The combination as defined in claim 1 wherein said variable impedance means comprises a plurality of reactors each having a variable-reluctance magnetic circuit.

4. The combination as defined in claim 3 wherein at least two of said reactors are connected in series, whereby the reluctance of the magnetic circuits of both thereof must be at a limiting value to maintain the voltage supplied to said input winding above said lower value.

5. The combination as defined in claim 3 wherein at least two of said reactors are connected in parallel, whereby minimum impedance of either or both thereof will maintain the voltage across said input winding on the same side of both of said critical values.

6. The combination as defined in claim 1 comprising, in addition, a variable reactance element connected across the output winding of said ferro-resonant transformer in parallel with a load.

References Cited in the file of this patent

UNITED STATES PATENTS

| | | |
|---|---|---|
| 1,996,041 | Emmerling | Mar. 26, 1935 |
| 2,725,515 | Horton | Nov. 29, 1955 |
| 2,827,575 | Smith | Mar. 18, 1958 |